ered alumina hydrate with about 0.2 to 5 percent by weight of a liquid mixture of $C_{10}$–$C_{20}$ carboxylic acids having a titer below about 30° C. and an iodine value of about 15 or less. In a preferred embodiment, the alumina hydrate has a particle size of less than about two microns, and the liquid mixture of acids comprises isostearic acid.

United States Patent [19]

Bonsignore

[11] 4,283,316
[45] Aug. 11, 1981

[54] SURFACE MODIFICATION OF ALUMINA HYDRATE WITH LIQUID FATTY ACIDS

[75] Inventor: Patrick V. Bonsignore, Murrysville, Pa.

[73] Assignee: Aluminum Company of America, Pittsburgh, Pa.

[21] Appl. No.: 186,790

[22] Filed: Sep. 12, 1980

[51] Int. Cl.³ ............................................. C08K 9/04
[52] U.S. Cl. ............................. 260/23 XA; 260/23 H; 260/42.14; 106/308 F
[58] Field of Search ............. 260/23 XA, 23 H, 42.14, 260/42.46, 42.49, 42.44, 42.45; 106/308 F

[56] References Cited

U.S. PATENT DOCUMENTS

| | | | |
|---|---|---|---|
| 3,699,041 | 10/1972 | Sanderford | 252/8.1 |
| 3,728,143 | 4/1973 | Pollard | 106/308 N |
| 3,781,177 | 12/1973 | Kondis | 149/6 |
| 3,826,775 | 7/1974 | Sobelev | 260/42.14 |
| 3,844,810 | 10/1974 | Pollard | 106/308 N |
| 3,860,542 | 1/1975 | Sakaguchi | 260/42.46 |
| 3,936,403 | 2/1976 | Sakaguchi | 260/23 XA |
| 3,953,218 | 4/1976 | Pollard | 106/19 |
| 3,957,723 | 5/1976 | Lawson | 260/42.46 |
| 4,062,693 | 12/1977 | Berger | 106/308 Q |
| 4,105,465 | 8/1978 | Berger | 106/308 Q |
| 4,132,700 | 1/1979 | Stephens | 260/42.14 |
| 4,173,492 | 11/1979 | Pollard | 106/308 F |
| 4,216,130 | 8/1980 | Rigge | 260/29.7 R |

Primary Examiner—Paul R. Michl
Attorney, Agent, or Firm—Glenn E. Klepac

[57] ABSTRACT

A surface modified alumina hydrate composition compatible with thermoplastic resins when used as a flame retardant and smoke suppressing filler. Surface modification is accomplished by treating powdered alumina hydrate with about 0.2 to 5 percent by weight of a liquid mixture of $C_{10}$–$C_{20}$ carboxylic acids having a titer below about 30° C. and an iodine value of about 15 or less. In a preferred embodiment, the alumina hydrate has a particle size of less than about two microns, and the liquid mixture of acids comprises isostearic acid.

15 Claims, No Drawings

4,283,316

SURFACE MODIFICATION OF ALUMINA HYDRATE WITH LIQUID FATTY ACIDS

BACKGROUND OF THE INVENTION

The present invention relates to alumina hydrate used as a filler for thermoplastic resins. More specifically, the invention concerns surface modification of alumina hydrate to render the hydrate compatible with thermoplastic resins.

Inorganic materials, such as alumina hydrates, talc and calcium carbonate, are frequently employed as fillers in thermoplastic resins, including polypropylene, polyethylene and polyvinyl chloride (rigid and flexible). The fillers can impart increased mechanical strength, stiffness and, in the case of alumina hydrate, increased flame retardancy and decreased smoke generation. Filled thermoplastic resins are widely used as molded components in automobiles, appliances and machine housings and as extruded components in sheet and tube form, for example, in wire and cable jacketing.

When alumina hydrates are added to thermoplastic resins in amounts needed to achieve a reasonable degree of flame retardancy (about 35 to 65 percent by weight), the hydrates can detrimentally influence physical properties even where uniformly dispersed. For example, when incorporated into polypropylene, they reduce flexibility and impact strength. Even more detrimental to physical properties is the difficulty of realizing uniform dispersions of alumina hydrate in the resins. Gross heterogeneities caused by undispersed agglomerates can seriously compromise physical properties, especially impact strength and cosmetic qualities, such as gloss and surface smoothness. Consequently, the use of alumina hydrate, which is otherwise an excellent and low cost flame retardant filler, is considered less desirable than other fillers for most applications where retention of physical properties is required.

It is a principal object of the present invention to provide powdered alumina hydrate with a surface coating that will cause filled thermoplastic compounds made with the hydrate to exhibit satisfactory flame retardancy and smoke suppressive qualities and improved final physical properties compared with thermoplastic compounds filled with an equivalent amount of unmodified alumina hydrate.

It is a related object of the invention to provide a surface modified alumina hydrate composition that possesses improved processing characteristics.

Additional objects and advantages of the invention will become apparent to persons skilled in the art from the following specification.

SUMMARY OF THE INVENTION

In accordance with the present invention, powdered alumina hydrate is combined with about 0.2 to 5 percent, based on the weight of the alumina hydrate, of a liquid mixture of carboxylic acids having a titer (congealing temperature) below about 30° C. Mixtures of saturated carboxylic acids having an iodine value of about 15 or less, and preferably about 12 or less, are preferred. A particularly preferred fatty acid mixture has an iodine value of about three or less and is sold commercially under the designation "isostearic acid".

Mixtures of $C_{10}$–$C_{20}$ saturated carboxylic acids are useful, with $C_{16}$–$C_{20}$ saturated acids being preferred. The particularly preferred isostearic acid is a mixture of saturated, mostly $C_{18}$ carboxylic acids. Titer of the acid mixture is preferably below about 20° C. and optimally about 8° to 10° C.

A surface modified alumina hydrate composition made in accordance with the invention preferably contains about 0.2 to 2 percent isostearic acid, based on the weight of the hydrate. A particularly preferred alumina hydrate composition described in the examples contains about one percent isostearic acid.

The powdered alumina hydrate preferably has an average particle size less than about 15 microns, more preferably less than about five microns, and most preferably less than about two microns. Optimally, essentially all of the alumina hydrate has a particle size less than about two microns, with a nominal particle size of about one micron. The alumina hydrate may contain about 15 to 35 percent by weight water as determined by calcination at 1000° F. for one hour.

The surface modified, isostearic acid coated alumina hydrate composition is mixed with a thermoplastic resin to form filled thermoplastic resin compounds. Suitable resins are polyethylene, polypropylene, polyvinyl chloride and mixtures and copolymers thereof. Up to about 190 parts by weight of thermoplastic resin are mixed with 100 parts by weight of the coated hydrate composition to form a filled thermoplastic compound. Filled thermoplastic compounds made in accordance with the invention have improved flexibility, impact strength and appearance compared with filled resin compounds in which unmodified alumina hydrate is used.

DETAILED DESCRIPTION OF A PREFERRED EMBODIMENT

This invention relates to surface modified alumina hydrates employed as fillers for thermoplastic resins.

For purposes of this description, the expression "alumina hydrate" refers to $Al_2O_3.xH_2O$, wherein x varies from 1 to 3; in other words, the water of the alumina hydrate varies between 15 and 35 percent by weight of the alumina hydrate, determined by calcination of the alumina hydrate at 1000° F. for one hour. Alumina hydrate which is modified according to the invention can be obtained from many sources, most commonly as the product of the well-known Bayer process.

The expression "thermoplastic resin" as used herein refers to polymeric compositions which can be heated and softened numerous times without suffering any basic alteration in characteristics.

The term "isostearic acid" as used herein is not intended to be restricted to its literal translation of 16-methylheptadecanoic acid, but rather is intended in its more common meaning, as is normally associated with a coined name, in this case, for mixtures of $C_{18}$ saturated fatty acids of the general formula $C_{17}H_{35}COOH$. These are rather complex mixtures of isomers, liquid at room temperature and primarily of the methyl-branched series, which are mutually soluble and virtually inseparable. While most of the branched chains contain a total of 18 carbon atoms, not necessarily all of the molecules contain exactly that number. The branch is primarily methyl but may possibly include some ethyl, and the distribution is typically primarily towards the center of the chain but is still fairly random. Methods pertaining to the production of isostearic acid are contained in U.S. Pat. Nos. 2,664,429 and 2,812,342. One source of isostearic acid suitable in practicing the invention is marketed commercially by Emery Industries, Inc. under the trade name Emersol 875 Isostearic Acid. Typical characteristics of this acid are listed in the following table:

|  | Minimum | Maximum |
|---|---|---|
| Titer °C. |  | 10.0 |
| Iodine value |  | 3.0 |
| Acid value | 191 | 201 |
| Saponification value | 197 | 204 |
| Molecular weight (approx.) 284 |  |  |

The surface modified alumina hydrate described herein can be produced quite economically by blending or mixing, employing more or less conventional means, particulate alumina hydrate with the appropriate amount of isostearic acid, thereby applying to the particulate surfaces a coating of isostearic acid. The isostearic acid is liquid at room temperature and thus can be applied directly to the alumina hydrate. Double-cone mixers, rotating disc mixers and ribbon blenders can be used as well as medium and high intensity powder blending equipment. The coating may be done at room temperature or at higher temperatures if more convenient.

The following examples and tables are presented for further illustration of the effects of the novel alumina hydrate-isostearic acid coated compositions when used as fillers for thermoplastic resins.

EXAMPLES

An alumina hydrate, the composition of which is shown in Table I, was used for all comparative tests used in these examples. The alumina hydrate, Hydral 710 (Aluminum Company of America), where indicated, was surface coated with one percent of isostearic acid (Emery Industries Emersol 875 Isostearic Acid) in a high intensity PVC powder blender (Welex) for 15 minutes with the temperature of mixing allowed to rise to 150° F.

TABLE I

Typical Composition and Characteristics of Alumina Hydrate (Hydral 710)

| Typical Properties |  |
|---|---|
| $Al_2O_3$, % by weight | 64.7 |
| $SiO_2$, % by weight | 0.04 |
| $Fe_2O_3$, % by weight | 0.01 |
| $Na_2O$ (total), % by weight | 0.45 |
| $Na_2O$ (soluble), % by weight | 0.10 |
| Moisture (110° C.), % by weight | 0.3 |
| Bulk density, loose, lb./ft.$^3$ | 8–14 |
| Bulk density, packed, lb./ft.$^3$ | 16–28 |
| Specific gravity | 2.40 |
| Specific surface area, $m^2/g$ | 6–8 |
| Particle distribution, cumulative, as determined by electron microscope on a weight basis |  |
| % less than 2 microns | 100 |
| % less than 1 micron | 85 |
| % less than 0.5 micron | 28 |

EXAMPLE 1

Effect of Isostearic Acid Coating for Alumina Hydrate on Impact Strength of Filled Polypropylene Alumina hydrate (Hydral 710-Alcoa) was compounded into a high impact grade of polypropylene, Shell Chemical Co. 7328 (melt flow 2.0 dg/min, ASTM D1238-70) on a laboratory two-roll mill at 390° F. for seven minutes. The sheeted compound was removed, cooled, granulated, then compression molded at 380° F. into 0.125 inch test placques. Impact strengths were determined according to ASTM D-256-78, Method A (except unnotched).

TABLE II

Impact Strength of Filled Polypropylene

| Test Sample | Alumina Hydrate (parts per 100 parts polypropylene resin) | Alumina Hydrate Coating | Oxygen Index ASTM D2863-77 | Impact Strength Izod Impact[a] (Unnotched, ft. lb./in.) |
|---|---|---|---|---|
| C-5[b] | 45 | None | 21 | 2.3 |
| C-6[b] | 45 | 1% isostearic acid | 21 | 3.3 |
| C-2 | 100 | None | 24 | 0.9 |
| C-7 | 100 | 1% isostearic acid | 23.5 | 1.8 |

[a] by ASTM D256-78, Method A, except unnotched
[b] also contains 6 parts reinforcing mineral fiber per 100 parts polypropylene resin

EXAMPLE 2

Effect of Isostearic Acid Surface Modified Alumina Hydrate on Physical Properties of Filled Polypropylene The procedure of Example 1 was followed. The polypropylene base plastic was Shell Chemical Co.'s 7328, high impact grade.

TABLE III

Physical Properties of Filled Polypropylene

| Test Sample | Alumina Hydrate[a] (parts per 100 parts polypropylene) | Alumina Hydrate Coating | Izod Impact Strength[c] Unnotched | Izod Impact Strength[c] Notched | Oxygen Index[d] | UL-94 VBT[e] | Tensile Strength (psi)[f] At Yield | Tensile Strength (psi)[f] At Break | % Elongation |
|---|---|---|---|---|---|---|---|---|---|
| H-1 | 50 | None | 2.25 | 0.43 | 21.5 | Fail | 5180 | 2661 | 4.3 |
| G-2 | 50 | 1% isostearic acid[b] | 5.1 | 0.51 | 21.5 | Fail | 2590 | 1984 | 15.7 |
| I-4 | 150 | None | 0.19 | 0.06 | 29.0 | V-O | 1604 | 1604 | 1.0 |
| I-9 | 150 | 1% isostearic acid[b] | 1.05 | 0.32 | 26.5 | V-O | 2071 | 2071 | 1.0 |

[a] Hydral 710 (Alcoa)
[b] Emersol 875 isostearic acid (Emery Industries)
[c] Foot-pounds/inch ASTM D256-78, Method A
[d] ASTM D-2863-77
[e] Underwriters Laboratories Vertical Burn Test
[f] ASTM D638-77a Elongation and impact strength are seen to be enhanced for the filled polypropylene containing the isostearic acid surface modified alumina hydrate.

EXAMPLE 3

Effect of Isostearic Acid Surface Modified Alumina Hydrate on Spiral Mold Flow Properties of Filled Polypropylene and Polyethylene A comparative ranking was made of filled polyethylene and polypropylene as related to melt flow travel in a spiral mold flow injection molder. The polypropylene (PP) used was Shell Chemical Co. high impact grade 7328 of melt flow 2.0 dg/g ASTM D1238-70 and the polyethylene (PE) used was Super-Dylan 7180 of ARCO Polymers of melt index 18. For this test mold temperature was 380°–385° F. with the same injection pressure being used for all samples.

TABLE IV

Spiral Mold Melt Flow of Filled Polyethylene and Polypropylene

| Sample | Plastic Resin | Alumina Hydrate (parts per 100 parts resin) | Alumina Hydrate Coating | Mold Flow (inches) | Appearance |
|---|---|---|---|---|---|
| N3B | PE | 67 | None | 24.1 | Brittle, rough surface |
| N2B | PE | 67 | 1% isostearic acid | 32.8 | Smooth |
| N6B | PE | 150 | None | 9.4 | Many voids, crumbly |
| N5B | PE | 150 | 1% isostearic acid | 28.8 | Smooth, brittle |
| N10A | PP | 67 | None | 9.4 | Rough finish, voids |
| N9B | PP | 67 | 1% isostearic acid | 10.0 | Good fill |
| N13B | PP | 150 | None | 6.2 | Rough large air voids, slight degradation |
| N12A | PP | 150 | 1% isostearic acid | 9.3 | Rough finish |

In general, significantly improved melt flow occurred for the filled polyethylene and polypropylene when the alumina hydrate was surface modified with isostearic acid. Simplistically, the improved melt flow can be translated into improved mold filling ability with better surface characteristics, such as gloss and smoothness.

EXAMPLE 4

Effect of Isostearic Acid Surface Coating of Alumina Hydrates on Melt Processing Behavior of Rigid PVC Compounds A standard PVC rigid vinyl compound was prepared according to the following formula:

| Component | Parts by Weight |
|---|---|
| PVC resin (B.F. Goodrich Geon 103 EPF-76) | 100 |
| Thermal stabilizer | 2 |
| Processing Aid | 1.5 |
| Impact modifier | 6.0 |
| Titania pigment | 3.0 |
| Lubricants (calcium stearate and polyethylene wax) | 3.0 |

This mix was dry blended with alumina hydrate (Hydral 710) at 35 parts per 100 parts resin. The dry blend was then evaluated for melt fusion behavior in a torque rheometer. A Brabender Plasticorder torque rheometer (C. W. Brabender, Hackensack, New Jersey) was used. Fusion data was obtained with the #6 roller head under the following conditions:

| | |
|---|---|
| Sensitivity | 1:5 × 5 |
| Damp | 6 seconds |
| Speed | 50 rpm |
| Temperature | 228° C. |
| Loading | 55 grams. |

The results are collected in Table V.

TABLE V

Melt Fusion Behavoir of Rigid PVC Compounds Containing Alumina Hydrates

| Sample | Time to Melt (min.) | Torque at Melt (m-g) | Temp. at Melt | Time to Fuse (min.) | Torque at Fusion (m-g) | Time to Stabilize (min.) | Torque at Stabilization (m-g) | Time to Degrade (min.) |
|---|---|---|---|---|---|---|---|---|
| 100 parts PVC + 35 parts alumina hydrate | 0.65 | 880 | 172° C. | 1.0 | 2525 | 6.5 | 1350 | 8.4 |
| 100 parts PVC + 35 parts alumina hydrate with 1% isostearic acid | 0.6 | 600 | 171° C. | 1.0 | 2400 | 8.8 | 1350 | 10.8 |

The above data demonstrate that a lower melt torque is developed at melt and at fusion with the isostearic acid surface modified alumina hydrate. Also significant is the improved thermal stability (longer time to degrade) for the isostearic acid surface modified alumina hydrate filled PVC compound.

EXAMPLE 5

The effect of isostearic acid surface modified alumina hydrate as a filler in rigid PVC compound was examined at two levels, 20 phr (parts alumina hydrate per 100 parts resin) and 40 phr. Rigid PVC compound powder blends were made up according to Example 4. The powder blends were extruded in 3-inch wide strips at a thickness of about 0.035 inch. The extruder was a ¾" single screw type associated with the torque rheometer. Temperature of extrusion was 380°-385° F.

Physical properties of the extruded strips are given in Table VI.

TABLE VI

Physical Properties of Rigid PVC Compounds Containing Alumina Hydrate

| Sample | Alumina Hydrate (phr) | Thickness (inches) | Density (g/cm$^3$) | Tensile Strength (psi) | Falling Dart Impact (in. lb./.001 in.) | % Elongation |
|---|---|---|---|---|---|---|
| W-1-29-1 | none (control) | 0.032 | 1.51 | 7875 | 3.00 | 125 |
| W-1-29-2 | 20 (uncoated) | 0.032 | 1.41 | 5488 | <0.32 | 25 |
| W-1-29-6 | 20 (1% Isostearic Acid Coated) | 0.036 | 1.54 | 5944 | 0.65 | 54 |
| W-1-29-3 | 40 (uncoated) | 0.037 | 1.14 | 2940 | <0.27 | 8.4 |
| W-1-29-7 | 40 (1% Isostearic Acid Coated) | 0.038 | 1.49 | 5326 | 0.74 | 125 |

Of most interest is the very low density of the rigid PVC compounds filled with uncoated alumina hydrate as compared to the density of the same compound filled with isostearic acid surface modified alumina hydrate. The much lower density can be explained by an air foamed structure probably resulting from poor compatibility of the uncoated alumina hydrate with the PVC resin matrix, i.e. an undisplaced surface occluded shell of air associated with the uncoated alumina hydrate filler. The isostearic acid surface modified alumina hydrate gives a filled composite of density more in line with that expected by proportionate ratios of densities of the alumina hydrate (2.42 g/cm$^3$) and of the PVC compound (1.37 g/cm$^3$). The significantly improved impact strength, tensile strength and elongation of the PVC compound containing isostearic acid surface coated alumina hydrate as compared to the same PVC compound containing the uncoated alumina hydrate is also noteworthy.

The foregoing description of my invention has been made with reference to a particularly preferred embodiment. Persons skilled in the art will understand that numerous changes and modifications can be made therein without departing from the spirit and scope of the following claims.

What is claimed is:

1. A surface modified alumina hydrate composition compatible with thermoplastic resins, said composition comprising
    powdered alumina hydrate having an average particle size of less than about 15 microns, and
    about 0.2 to 5 percent, based on the weight of the alumina hydrate, of a liquid mixture of $C_{10}$-$C_{20}$ carboxylic acids, said mixture having a titer below about 30° C. and an iodine value of about 15 or less.

2. The composition of claim 1 wherein said mixture of carboxylic acids has an iodine value of about 12 or less.

3. The composition of claim 1 wherein said acids are $C_{16}$-$C_{20}$ carboxylic acids.

4. The composition of claim 1 wherein said mixture of acids comprises isostearic acid.

5. The composition of claim 1 wherein the titer of said mixture of acids is below about 20° C.

6. The composition of claim 1 wherein the titer of said mixture of acids is about 8° to 10° C.

7. The composition of claim 1 containing about 0.2 to 2 percent of $C_{10}$-$C_{20}$ carboxylic acids.

8. The composition of claim 7 containing about one percent of $C_{10}$-$C_{20}$ carboxylic acids.

9. The composition of claim 1 wherein said alumina hydrate has an average particle size of less than about five microns.

10. The composition of claim 9 wherein said alumina hydrate has an average particle size of less than about two microns.

11. The composition of claim 10 wherein essentially all of said alumina hydrate has a particle size of less than two microns.

12. The composition of claim 1 wherein said alumina hydrate contains about 15 to 35% by weight water as determined by calcination at 1000° F. for one hour.

13. A thermoplastic resin compound comprising
    about 100 parts by weight of a thermoplastic resin selected from the group consisting of polyethylene, polypropylene, polyvinyl chloride and mixtures and copolymers thereof, and
    up to about 190 parts by weight of the composition of claim 1.

14. The compound of claim 13 wherein said thermoplastic resin comprises polypropylene.

15. An improved method for dispersing powdered alumina hydrate having an average particle size of less than about 15 microns in a thermoplastic resin, said method comprising the steps of
    modifying the surface characteristics of the hydrate by mixing the hydrate with 0.2 to 5 percent by weight of a mixture of $C_{10}$-$C_{20}$ carboxylic acids, said mixture having a titer below about 30° C. and an iodine value of about 15 or less, thereby to form a surface modified hydrate composition, and
    admixing up to 65 percent of the hydrate composition, based on total weight of the hydrate composition and resin, in a thermoplastic resin.

* * * * *